US011200069B1

(12) United States Patent
King et al.

(10) Patent No.: US 11,200,069 B1
(45) Date of Patent: Dec. 14, 2021

(54) SYSTEMS AND METHODS FOR GENERATING A SOFTWARE APPLICATION

(71) Applicant: HONEYWELL INTERNATIONAL INC., Morris Plains, NJ (US)

(72) Inventors: Wayne King, Phoenix, AZ (US); Ronald Kilmer, Glendale, AZ (US); William R. Hancock, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/000,070

(22) Filed: Aug. 21, 2020

(51) Int. Cl.
*G06F 9/445* (2018.01)
*G06F 8/71* (2018.01)
*G06F 11/36* (2006.01)
*G06F 8/41* (2018.01)
*G06F 8/20* (2018.01)

(52) U.S. Cl.
CPC ........... *G06F 9/44505* (2013.01); *G06F 8/22* (2013.01); *G06F 8/433* (2013.01); *G06F 8/71* (2013.01); *G06F 11/3612* (2013.01)

(58) Field of Classification Search
CPC ........ G06F 9/44505; G06F 8/22; G06F 8/433; G06F 8/71; G06F 11/3612
See application file for complete search history.

(56) References Cited

U.S. PATENT DOCUMENTS 7,941,438 B2 5/2011 Molina-Moreno et al.
8,689,192 B2 4/2014 Dargelas
9,063,673 B2 6/2015 Weigert et al.
9,146,729 B2 9/2015 Mallur et al.
(Continued)

FOREIGN PATENT DOCUMENTS

CN 105204383 A 12/2015
CN 106446412 B 2/2017

OTHER PUBLICATIONS

Wang, Lisong, et al. "Formal Verification Method for Configuration of Integrated Modular Avionics System Using MARTE," International Journal of Aerospace Engineering, vol. 2018, Article ID 7019838, Apr. 22, 2018.

*Primary Examiner* — Phillip H Nguyen
(74) *Attorney, Agent, or Firm* — Lorenz & Kopf, LLP

(57) ABSTRACT

A software development system for generating a software application is provided. The software development system comprises a configuration file generator tool configured to: read a design model comprising a plurality of individual blocks with a specified data flow between the blocks, wherein each block has a defined behavioral expectation, wherein the design model is configured to cause a desired behavior for the software application when given a set of inputs. The configuration file generator tool is further configured to generate a configuration file, based on the design model, that identifies a plurality of preexisting, verified, and compiled/linked software code segments configured to perform mathematical and/or logical actions to cause the desired behavior for the software application. The configuration file configures an execution engine to execute the portion of the software application represented by the model by invoking execution of the plurality of preexisting, verified, and compiled/linked software code segments specified in the configuration file.

20 Claims, 5 Drawing Sheets

(56) References Cited

U.S. PATENT DOCUMENTS

| | | | |
|---|---|---|---|
| 9,250,893 B2 | 2/2016 | Blahaerath et al. | |
| 9,354,624 B2 | 5/2016 | Truscott et al. | |
| 9,718,563 B2 | 8/2017 | Marestin et al. | |
| 9,940,222 B2 | 4/2018 | Li et al. | |
| 10,108,536 B2 | 10/2018 | Li | |
| 10,346,140 B2 | 7/2019 | Johnson et al. | |
| 10,402,173 B2 | 9/2019 | Ren et al. | |
| 2004/0031015 A1* | 2/2004 | Ben-Romdhane | G06F 8/75 717/107 |
| 2011/0088011 A1* | 4/2011 | Ouali | G06F 8/10 717/105 |
| 2012/0246612 A1 | 9/2012 | Ji et al. | |
| 2013/0247005 A1* | 9/2013 | Hirsch | G06F 8/30 717/121 |
| 2013/0305218 A1* | 11/2013 | Hirsch | G06F 8/36 717/106 |
| 2014/0317593 A1 | 10/2014 | Cheng et al. | |
| 2015/0088476 A1 | 3/2015 | Guo et al. | |
| 2015/0347127 A1 | 12/2015 | Leibham et al. | |
| 2016/0063384 A1 | 3/2016 | Green et al. | |
| 2016/0170743 A1* | 6/2016 | Shmulevich | G06F 8/30 717/120 |
| 2017/0039039 A1 | 2/2017 | Johnson et al. | |
| 2018/0129941 A1 | 5/2018 | Gustafson et al. | |
| 2018/0196739 A1 | 7/2018 | Li et al. | |
| 2018/0246703 A1 | 8/2018 | Ren et al. | |
| 2019/0012183 A1* | 1/2019 | Saunders | G06F 9/448 |
| 2020/0089476 A1 | 3/2020 | Verhaeghe | |

\* cited by examiner

SYSTEMS AND METHODS FOR GENERATING A SOFTWARE APPLICATION

TECHNICAL FIELD

Embodiments of the subject matter described herein relate generally to software development systems. More particularly, embodiments of the subject matter relate to systems and methods for generating a software application.

BACKGROUND

Software development costs can be high for safety-critical software, such as aviation software, for example, due to costs associated with meeting certification standards (e.g., DO-178B/C for aviation software). It can be difficult and costly to upgrade to newer versions of modeling tools, because of the need for unique code files per models, and a qualified source code review tool. Software verification costs can be excessive.

Hence, it is desirable to provide systems and methods for generating a software application that are less burdensome. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A software development system for generating a software application is disclosed. The software development system includes a configuration file generator tool implemented by a processing component. The configuration file generator tool is configured to: read a first design model that is constructed from a plurality of individual blocks with a specified data flow between the blocks, wherein each block has a defined behavioral expectation (e.g., debounce, integrate, 1st order Lag, multiplication, filter, limiter, logic function, math function, XOR), wherein the first design model is configured, by the plurality of individual blocks and the specified data flow between the blocks, to cause a desired behavior for the software application when given a set of inputs. The configuration file generator tool is further configured to generate a configuration file, based on the first design model, that identifies a plurality of preexisting, verified, and compiled/linked software code segments configured to perform mathematical and/or logical actions to cause the desired behavior for the software application. The configuration file, when read by an execution engine implemented on a processing component, configures the execution engine to execute the portion of the software application represented by the model by invoking execution of the plurality of preexisting, verified, and compiled/linked software code segments specified in the configuration file.

A computer-implemented method for generating a software application is disclosed. The method includes reading a design model that is constructed from a plurality of individual blocks with a specified data flow between the blocks, wherein each block has a defined behavioral expectation (e.g., debounce, integrate, 1st order Lag, multiplication, filter, limiter, logic function, math function, XOR), wherein the design model is configured, by the plurality of individual blocks and the specified data flow between the blocks, to cause a desired behavior for the software application when given a set of inputs. The method further includes generating a configuration file, based on the design model, that identifies a plurality of preexisting, verified, and compiled/linked software code segments configured to perform mathematical and/or logical actions to cause the desired behavior for the software application. The configuration file, when read by an execution engine implemented on a processing component, configures the execution engine to execute the portion of the software application represented by the model by invoking execution of the plurality of preexisting, verified, and compiled/linked software code segments specified in the configuration file.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
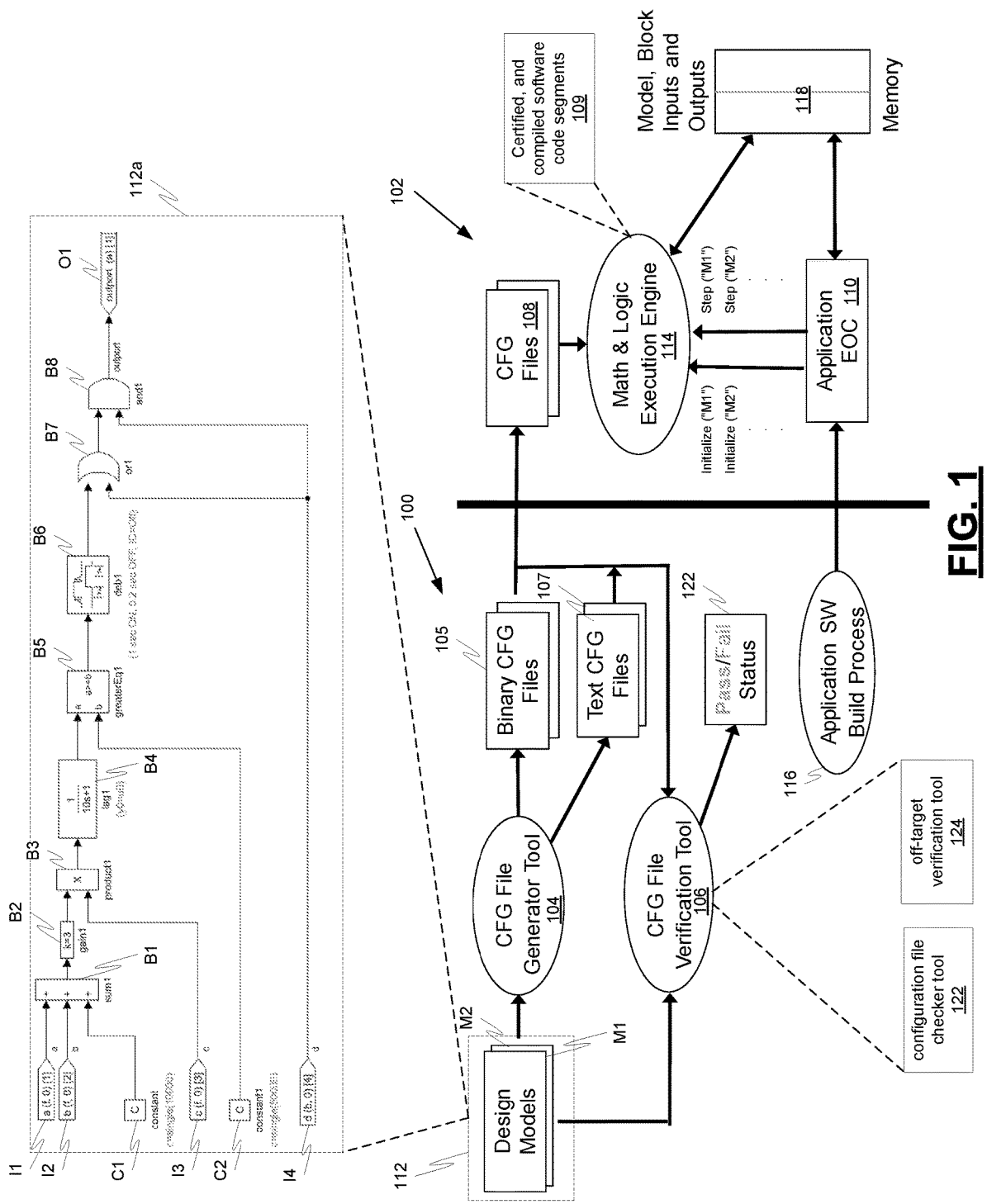
FIG. 1 is a block diagram depicting an example software development system that generates a software application for use in a computing environment, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for generating portions of a software application. The apparatus, systems, techniques and articles provided herein can provide a system and method for generating portions of a software application without the need for a source code generator tool, compiling automatically generated source code, and some software verification activities (e.g., DO-178C) when a new software application is desired to be implemented. The apparatus, systems, techniques, and articles provided herein describe a configuration file generator tool for generating a configuration file that identifies preexisting, compiled/linked software code segments that will cause desired behavior for the software application.

FIG. 1 is a block diagram depicting an example software development system 100 that generates a software application or a portion of the software application for use in a computing environment 102. The example software development system 100 includes a configuration (CFG) file generator tool 104, and a configuration file verification tool 106. The example configuration file generator tool 104 is configured to generate one or more configuration files 108 (e.g., one or more binary configuration files 105 and/or one or more text configuration files 107) that identify a plurality of preexisting, verified, and compiled/linked software code segments 109 configured to perform mathematical and/or logical actions to cause a desired behavior for the software application or portion of the software application. The example configuration file verification tool 106 is configured to verify whether the configuration file(s) 108 generated by the configuration file generator tool 104 will cause the desired behavior for the software application or portion of the software application.

Each of the example configuration file generator tool 104 and the example configuration file verification tool 106 includes and is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example configuration file generator tool 104 is configured to read one or more design model(s) 112 (e.g., design model M1 and design model M2), each design model 112 comprising a plurality of individual blocks with a specified data flow between the blocks, wherein each block has a defined behavioral expectation (e.g., debounce, integrate, $1^{st}$ order Lag, multiplication, filter, limiter, logic function, math function, XOR). The design model 112 is configured, by the plurality of individual blocks and the specified data flow between the blocks, to cause a desired behavior for the software application when given a set of inputs. The design model may have been generated using a graphical editor that presents diagrams and textual interactive dialogs which are used to enter requirements data defining the desired structure and behavior of an application program being designed.

An example design model 112a is depicted in FIG. 1. The example design model 112a includes a plurality of individual blocks (B1-B8) with a specified data flow between the blocks, wherein each block has a defined behavioral expectation. The example design model 112a further includes a plurality of input blocks (I1-I4) that can provide input to various individual blocks (B1, B3, B7-B8 in this example) at various stages in model execution, a plurality of constants (C1-C2) that can provide a constant input to various individual blocks (B1 and B5 in this example) at various stages in model execution, and an output block O1 from the last individual block B8.

The example configuration file generator tool 104 is further configured to generate the configuration file(s) 108, based on the one or more design model(s) 112. The generated configuration file(s) 108 identifies a plurality of preexisting, verified, and compiled/linked software code segments 109 configured to perform mathematical and/or logical actions to cause the desired behavior for the portion of the software application that is represented by the models. The example configuration file generator tool 104 may be configured to generate a single configuration file 108 for each design model (e.g., M1 or M2) such that the configuration files and the design models have a one for one correspondence. Alternatively or additionally, the configuration tool may be configured to generate a single configuration file that covers multiple design models.

The example configuration file generator tool 104 is further configured to generate a plurality of different user-selectable orders in which to execute the compiled/linked software segments representing the blocks in the model that obey data flow dependencies between the blocks. The plurality of orders includes a graphical order (e.g., top down and left to right) and one or more orders that are not directly based on a graphical ordering and that provide improved execution time behavior with an execution engine 114.

An execution engine 114 having access to the plurality of preexisting, verified, and compiled/linked software code segments 109 can execute the generated configuration file(s) 108. The execution engine 114 may obtain the generated configuration file(s) 108, via a number of different means (e.g., via a software "build" process and creation of loadable files, downloading to the target computer, etc.). The execution engine 114 is executed by a processing component and can invoke the execution of the plurality of preexisting, verified, and compiled/linked software code segments 109 using the set of inputs specified in the one or more configuration files 108 in the order specified in the configuration file(s) 108 to generate a desired set of outputs. The generated configuration file(s) 108, when read by the execution engine 114, configures the memory 118 (e.g., variable memory and/or heap) so that the execution engine 114 can use the memory 118 to provide the behavior described in the one or more models and the configuration file(s) 108. The plurality of preexisting, verified, and compiled/linked software code segments 109 can be generated prior to generation of the one or more configuration files 108 and used with the execution engine 114 using an application software build process 116 that includes compiling and verifying the various software code segments 109 and executable object code (EOC) 110 in the software application.

The software application executed within the example computing environment 102 has two components: a portion of the software application represented by the one or more models 112 and the rest of the software application provided by the EOC 110. At some point during execution of the software application, the portion of the software application represented by the one or more models 112 is invoked causing the execution engine 114 to read the memory 118 and execute the preexisting, verified, and compiled/linked software code segments 109 identified in the configuration file(s) 108. When more than one model is specified in the configuration file(s), the software application may invoke the portion of the software application representing a first of the models (M1) at one time and the portion of the software application representing a second of the models (M2) at a different time. That will cause the execution engine 114 to execute the preexisting, verified, and compiled/linked software code segments 109 identified in the configuration file(s) as representing the first model (M1) at the one time and the preexisting, verified, and compiled/linked software code segments 109 identified in the configuration file(s) as representing the second model (M2) at the different time. The software code segments representing the second model (M2) may execute immediately after the software code segments representing the first model (M1) executes. Alternatively other portions of the software application (portions of EOC 110) not represented by the one or more models 112 may execute between execution of the software code segments representing the first model (M1) and execution of the software code segments representing the second model (M2).

The example configuration file(s) 108 can identify the set of inputs to use with the plurality of software code segments in the execution engine 114 and an order for invoking the software code segments. The set of inputs may be stored in memory 118.

The example execution engine 114 configures itself by reading the configuration file(s) 108 to use the set of inputs specified in the configuration file(s) 108 to generate a set of outputs. The set of outputs may also be stored in memory 118. The example execution engine 114 configures itself by reading the configuration file(s) 108 to use the set of inputs specified in the configuration file(s) 108, and the block operations to perform on them, in the order specified in the configuration file(s) 108 to generate the set of outputs. When the application software 110 calls Initialize ("M1"), the execution engine 114 initializes the memory 118 so that the execution engine 114 knows how to execute the model M1 when the application software 110 calls step ("M1").

The configuration file verification tool 106 is designed to verify whether the configuration file(s) 108 generated by the configuration file generator tool 104 will cause the desired behavior for the software application. The configuration file verification tool 106 does so through reading the generated configuration file(s) 108 and the design model 112 on which the generated configuration file(s) is based, comparing the expected behavior from execution of the plurality of preexisting, verified, and compiled/linked software code segments 109 identified in the configuration file(s) 108 with the expected behavior from the design model 112, and indicating whether the generated configuration file(s) 108 is likely to cause the desired behavior for the software application. The indication may be provided through the provisions of a pass/fail status indication 122.

In one example, the configuration file verification tool 106 is composed of two major sub-tools: (i) a configuration file checker tool 122 that checks that the schema/data contents of a configuration file 108 per the model 112 and the configuration file requirements; and (ii) an off-target verification tool 124 that utilizes a qualified test case generator tool (not shown) to generate test cases from the same design model 112 that was used to create the configuration file 108. The off-target verification tool 124 causes these test cases to be run against the configuration file to verify that the system configuration file 108 is correct and complete for satisfying the behavior described in the design model 112.

Figure 2:
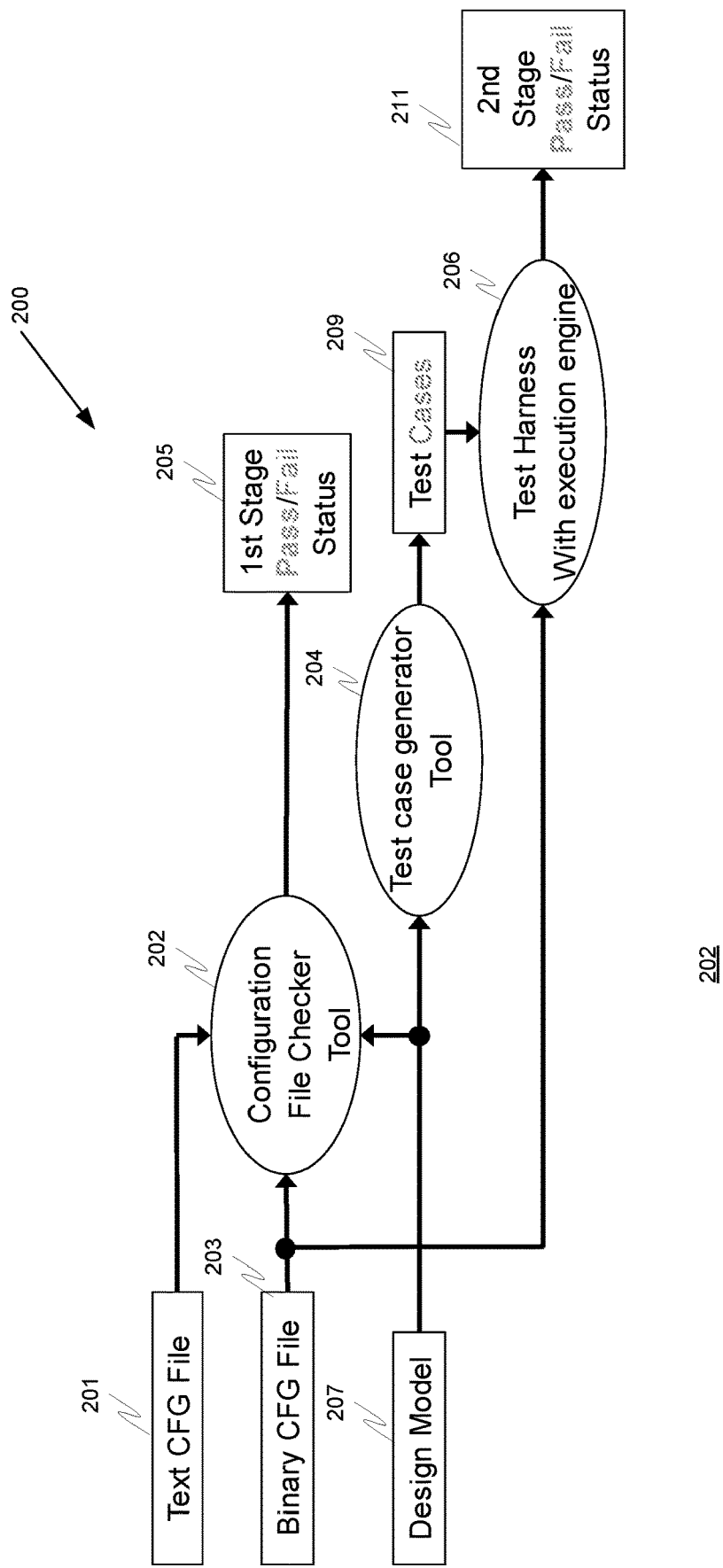
FIG. 2 is a block diagram depicting an example configuration file verification tool test environment, in accordance with some embodiments.

FIG. 2 is a block diagram depicting an example configuration file verification tool 200. In a first stage of operation, a configuration file checker tool 202 verifies that the system configuration file schema and data (e.g., as provided by binary configuration file 203) are correct and that the data structure complies with its requirements. The text configuration file 201 is used to enable this verification. The configuration file checker tool 202 can provide an indication (e.g., 1$^{st}$ stage pass/fail status indication 205) that the system configuration file has passed or failed verification tests after it verifies whether the system configuration file schema and data are correct and that the data structure complies with its requirements.

In a second stage of operation, the configuration file verification tool verifies that the system configuration file (e.g., binary configuration file 203) provides the behavior specified in the design model 207 by using a qualified test case generator 204 on the design model 207 to generate test cases 209, then testing the system configuration file, with the execution engine (e.g., test harness with execution engine 206) to verify that the system configuration file (e.g., binary configuration file 203) is correct and complete for satisfying the behavior described in the design model 207. After the configuration file verification tool tests whether the system configuration file (e.g., binary configuration file 203) is correct and complete for satisfying the behavior described in the design model 207, the configuration file verification tool can provide an indication (e.g., $2^{nd}$ stage pass/fail status indication 211) that the system configuration file has passed or failed verification tests.

Use of the example software development system 100 can eliminate, for portions of a software application whose desired behavior is modelled by design models, the need for a source code generator tool, compiling automatically generated source code, and some software verification activities (e.g., parts of DO-178C) when a new software application is desired to be implemented. Use of the example software development system 100 can eliminate the need for the generation of unique source code for each model since preexisting compiled/linked software code segments are used. Software verification costs can be reduced since preexisting, verified, and compiled/linked software code segments are used.

Figure 3:
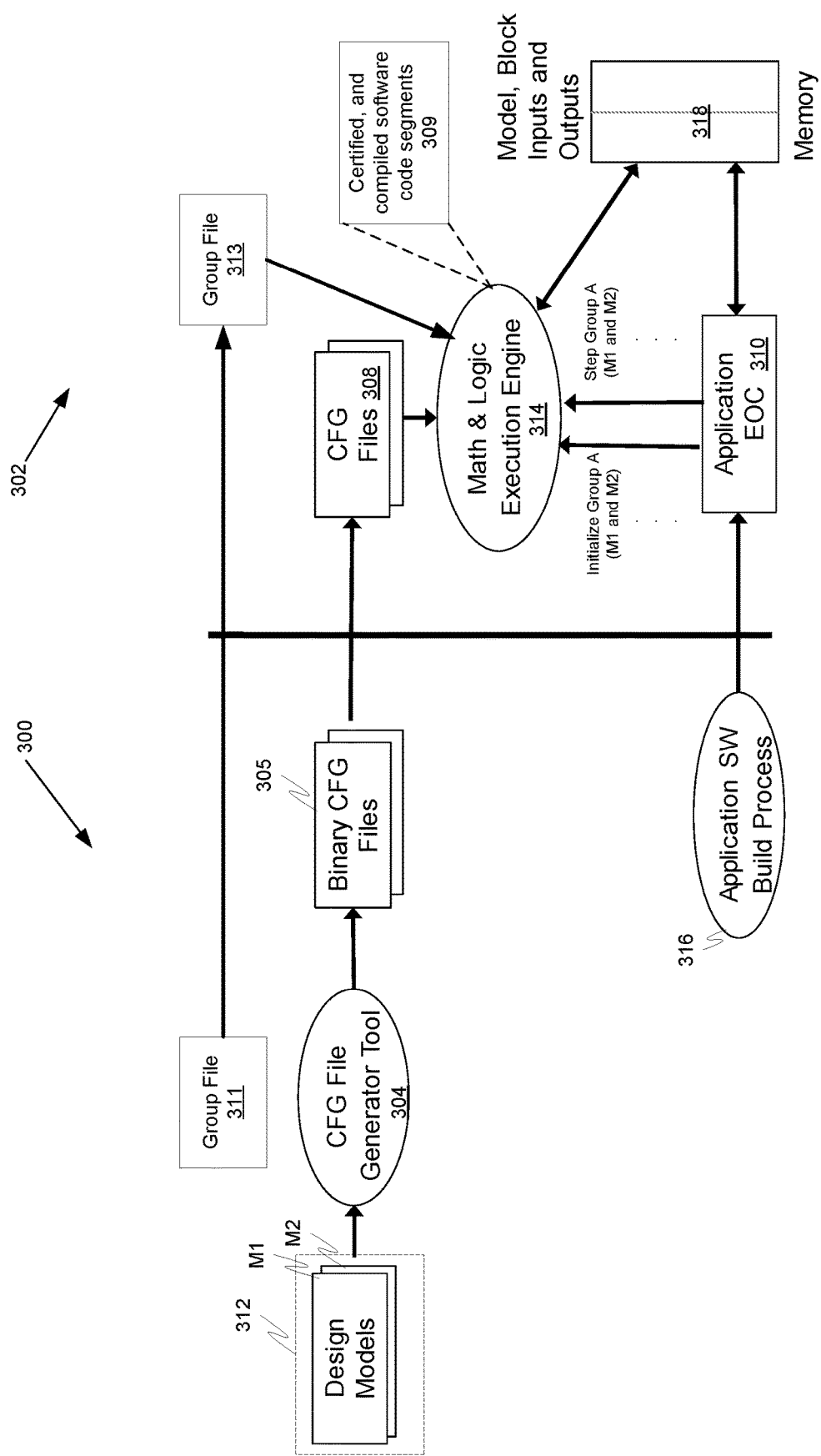
FIG. 3 is a block diagram depicting another example software development system that generates a software application or a portion of the software application for use in a computing environment, in accordance with some embodiments.

FIG. 3 is a block diagram depicting an example software development system 300 that generates a software application or a portion of the software application for use in a computing environment 302. The example software development system 300 includes a configuration (CFG) file generator tool 304. The example configuration file generator tool 304 is configured to generate one or more configuration files 308 (e.g., one or more binary configuration files 305 and/or one or more text configuration files (not shown)) that identify a plurality of preexisting, verified, and compiled/linked software code segments 309 configured to perform mathematical and/or logical actions to cause a desired behavior for the software application or portion of the software application.

The example configuration file generator tool 304 is configured to read one or more design model(s) 312 (e.g., design model M1 and design model M2) and generate the associated one or more configuration files 308, based on the one or more design model(s) 312. A generated configuration file 308 identifies a plurality of preexisting, verified, and compiled/linked software code segments 309 configured to perform mathematical and/or logical actions to cause the desired behavior for the portion of the software application that is represented by the models.

An execution engine 314 having access to the plurality of preexisting, verified, and compiled/linked software code segments 309 can execute one or more generated configuration files 308. The execution engine 314 is executed by a processing component and can invoke the execution of the plurality of preexisting, verified, and compiled/linked software code segments 309 using the set of inputs specified in the one or more configuration files 308 in the order specified in the configuration file(s) 308 to generate a desired set of outputs. The generated configuration file(s) 308, when read by the execution engine 314, configures the memory 318 (e.g., variable memory and/or heap) so that the execution engine 314 can use the memory 318 to provide the behavior described in the one or more models and their associated configuration file(s) 308. The plurality of preexisting, verified, and compiled/linked software code segments 309 can be generated prior to generation of the one or more configuration files 308 and used with the execution engine 314 using an application software build process 316 that includes compiling and verifying the various software code segments 309 and executable object code (EOC) 310 in the software application.

The software application executed within the example computing environment 302 has two components: a portion of the software application represented by the one or more models 312 and the rest of the software application provided by the EOC 310. At some point during execution of the software application, the portion of the software application represented by the one or more models 312 is invoked causing the execution engine 314 to read the memory 318 and execute the preexisting, verified, and compiled/linked software code segments 309 identified in the one or more configuration files 308.

More than one design model (e.g., M1 and M2) may be identified in a group file 311 as being grouped together for execution by the execution engine 314. The software application may be configured to invoke the execution engine 314 to initialize the software code segments 309 representing the grouped design models and invoke execution of the software code segments 309 representing the grouped design models. When the execution engine 314 is instructed to initialize the software code segments 309 representing the grouped design models, the execution engine 314 can read a group file 313 to identify the configuration files 308 that relate to the software code segments 309 representing the grouped design models. After initialization, the software application may invoke the execution engine 314 to execute the preexisting, verified, and compiled/linked software code segments 309 identified in the configuration files as representing the plurality of design models that are grouped together.

The example configuration files 308 can identify the set of inputs to use with the plurality of software code segments in the execution engine 314 and an order for invoking the software code segments. The set of inputs may be stored in memory 318.

The example configuration file generator tool 304 may be further configured to generate a plurality of different user-selectable orders in which to execute the compiled/linked software segments representing the blocks in the grouped models that obey data flow dependencies between the blocks. The plurality of orders includes a graphical order (e.g., top down and left to right) and one or more orders that are not directly based on a graphical ordering and that provide improved execution time behavior with an execution engine 314.

Figure 4:
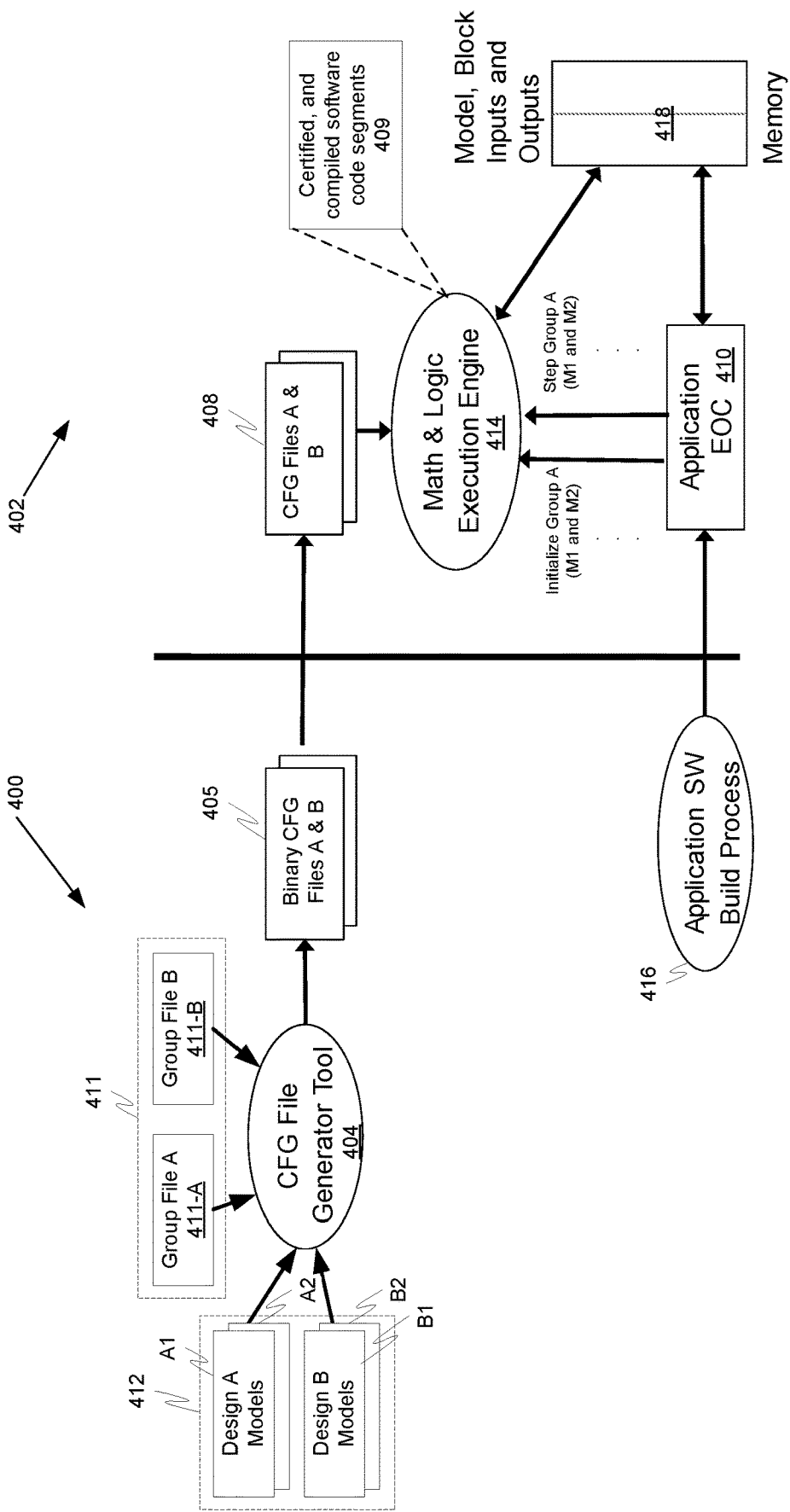
FIG. 4 is a block diagram depicting another example software development system that generates a software application or a portion of the software application for use in a computing environment, in accordance with some embodiments.

FIG. 4 is a block diagram depicting an example software development system 400 that generates a software application or a portion of the software application for use in a computing environment 402. The example software development system 400 includes a configuration (CFG) file generator tool 404 and may optionally include a configuration file verification tool (not shown). The example configuration file generator tool 404 is configured to generate one or more configuration files 408 (e.g., one or more binary configuration files 405 and/or one or more text configuration files (not shown)) that identify a plurality of preexisting, verified, and compiled/linked software code segments 409 configured to perform mathematical and/or logical actions to cause a desired behavior for the software application or portion of the software application.

The example configuration file generator tool 404 is configured to read a plurality of design models 412 (e.g., design model A1 and design model A2). More than one design model (e.g., A1 and A2) may be identified in a group file 411 (e.g., group file 411-A) as being grouped together for execution by the execution engine 414. The example configuration file generator tool 404 is configured to generate a single configuration file 408, based on the plurality of design model(s) 412, for each design model identified in group file A (411-A). When there are additional group files as shown in group file B (411-B), the example configuration file generator tool 404 is configured to generate a single configuration file 408 for each group of design models identified in a group file 411. The generated configuration file(s) 408 identify a plurality of preexisting, verified, and compiled/linked software code segments 409 configured to perform mathematical and/or logical actions to cause the desired behavior for the portion of the software application that is represented by the grouped design models.

An execution engine 414 having access to the plurality of preexisting, verified, and compiled/linked software code segments 409 can execute the generated configuration file(s) 408. The execution engine 414 is executed by a processing component and can invoke the execution of the plurality of preexisting, verified, and compiled/linked software code segments 409 using the set of inputs specified in the configuration file(s) 408 in the order specified in the configuration file(s) 408 to generate a desired set of outputs. The generated configuration file(s) 408, when read by the execution engine 414, configures the memory 418 (e.g., variable memory and/or heap) so that the execution engine 414 can use the memory 418 to provide the behavior described in the grouped models and the configuration file(s) 408. The plurality of preexisting, verified, and compiled/linked software code segments 409 can be generated prior to generation of a configuration file(s) 408 and use with the execution engine 414 using an application software build process 416 that includes compiling and verifying the various software code segments 409 and executable object code (EOC) 410 in the software application.

The software application executed within the example computing environment 402 has two components: a portion of the software application represented by the grouped models 412 and the rest of the software application provided by the EOC 410. At some point during execution of the software application, the portion of the software application represented by the grouped models 412 is invoked causing the execution engine 414 to read the memory 418 and execute the preexisting, verified, and compiled/linked software code segments 409 identified in the configuration files(s) 408.

The software application may be configured to invoke the execution engine 414 to initialize the software code segments 409 representing the grouped design models and invoke execution of the software code segments 409 representing the grouped design models. When the execution engine 414 is instructed to initialize the software code segments 409 representing the grouped design models, the execution engine 414 can read the configuration file(s) 408 that relate to the software code segments 409 representing the grouped design models. After initialization, the software application may invoke the execution engine 414 to execute the preexisting, verified, and compiled/linked software code segments 409 identified in the configuration file(s) as representing the plurality of design models that are grouped together.

The example configuration file(s) 408 can identify the set of inputs to use with the plurality of software code segments in the execution engine 414 and an order for invoking the software code segments. The set of inputs may be stored in memory 418.

The example configuration file generator tool 404 may be further configured to generate a plurality of different user-selectable orders in which to execute the compiled/linked software segments representing the blocks in the grouped models that obey data flow dependencies between the blocks. The plurality of orders includes a graphical order (e.g., top down and left to right) and one or more orders that are not directly based on a graphical ordering and that provide improved execution time behavior with an execution engine 414.

Figure 5:
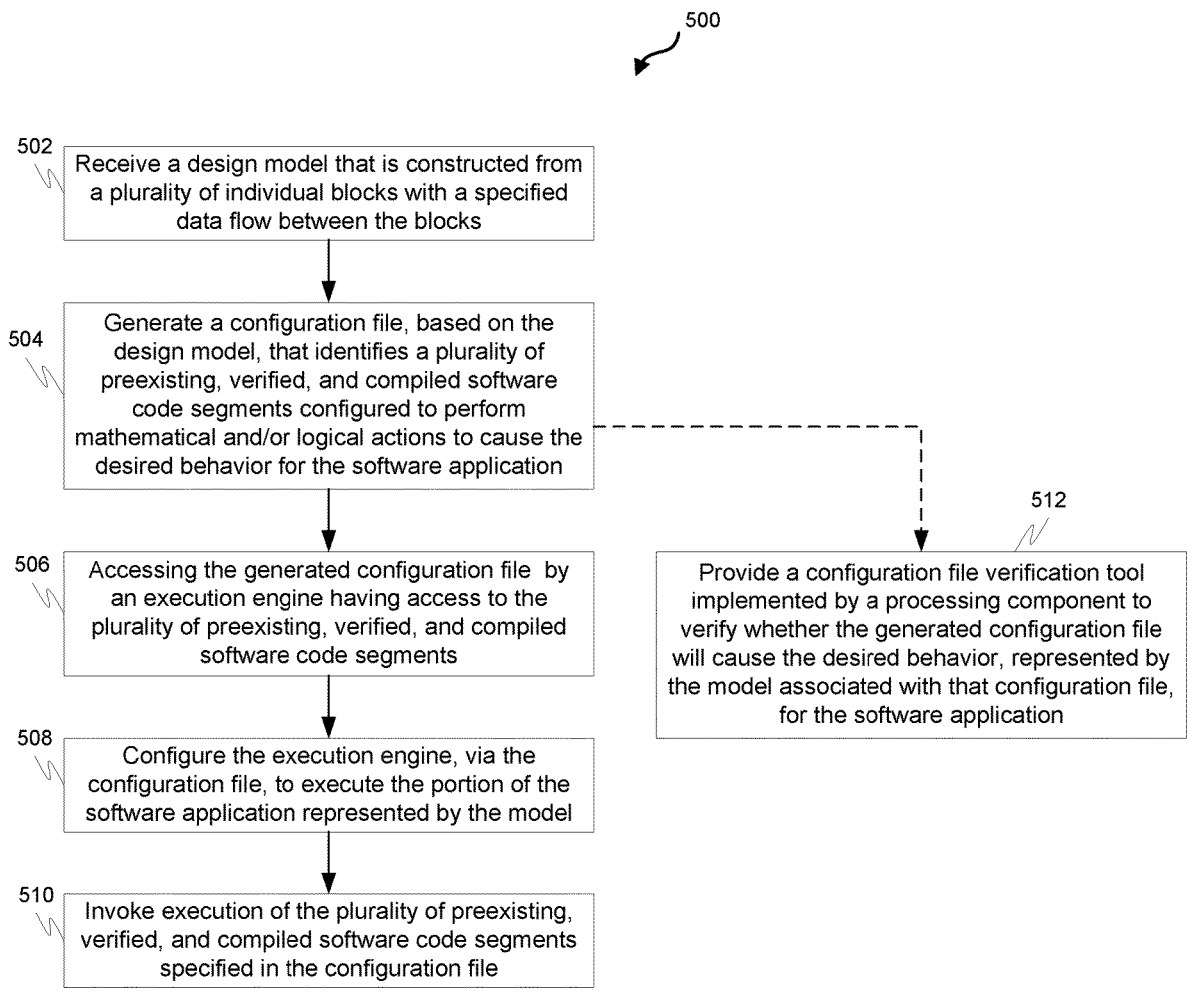
FIG. 5 is a process flow chart depicting an example process for generating a software application, in accordance with some embodiments.

FIG. 5 is a process flow chart depicting an example process 500 for generating portions of a software application. The order of operation within the process 500 is not limited to the sequential execution as illustrated in the figure but may be performed in one or more varying orders as applicable and in accordance with the present disclosure.

The example process 500 includes reading a design model that is constructed from a plurality of individual blocks with a specified data flow between the blocks (operation 502). Each block has a defined behavioral expectation (e.g., debounce, integrate, 1st order Lag, multiplication, filter, limiter, logic function, math function, XOR, etc.). The design model is configured, by the plurality of individual blocks and the specified data flow between the blocks, to cause a desired behavior for the software application when given a set of inputs.

The example process 500 includes generating a configuration file, based on the design model, that identifies a plurality of preexisting, verified, and compiled/linked software code segments configured to perform mathematical and/or logical actions to cause the desired behavior for the software application (operation 504). The configuration file identifies the set of inputs to use with the plurality of software code segments. The configuration file may identify an order for invoking the software code segments.

The example process 500 includes an execution engine having access to the plurality of preexisting, verified, and compiled/linked software code segments accessing the generated configuration file (operation 506), configuring the execution engine, via the configuration file, to execute the portion of the software application represented by the model (operation 508), and invoking execution of the plurality of preexisting, verified, and compiled/linked software code segments specified in the configuration file (operation 510). The execution engine may use the set of inputs specified in the configuration file to generate a set of outputs. The execution engine may use the set of inputs specified in the configuration file in the order specified in the configuration file to generate the set of outputs.

The example process 500 optionally includes providing a configuration file verification tool implemented by a processing component to verify whether the generated configuration file will cause the desired behavior, represented by the model associated with that configuration file, for the software application (operation 512). In one example, the configuration file verification tool is composed of two major sub-tools: (i) a configuration file checker tool that checks that the schema/data contents of a configuration file per configuration file requirements; and (ii) an off-target verification tool that utilizes a qualified test case generator tool to generate test cases from the same design model that was used to create the configuration file. The off-target verification tool causes these test cases to be run against the configuration file to verify that the system configuration file is correct and complete for satisfying the behavior described in the design model.

Described herein are apparatus, systems, techniques and articles for generating a software application. The apparatus, systems, techniques and articles provided herein can provide a system and method for generating a software application without the need for a source code generator tool, compiling automatically generated source code, and some software verification activities (e.g., DO-178C) when a new software application is desired to be implemented.

In one embodiment, a software development system for generating a software application is provided. The software development system comprises a configuration file generator tool implemented by a processing component. The configuration file generator tool is configured to: read a first design model comprising a plurality of individual blocks with a specified data flow between the blocks, wherein each block has a defined behavioral expectation (e.g., debounce, integrate, 1st order Lag, multiplication, filter, limiter, logic function, math function, XOR), wherein the first design model is configured, by the plurality of individual blocks and the specified data flow between the blocks, to cause a desired behavior for the software application when given a set of inputs. The configuration file generator tool is further configured to generate a configuration file, based on the first design model, that identifies a plurality of preexisting, verified, and compiled/linked software code segments configured to perform mathematical and/or logical actions to cause the desired behavior for the software application. The configuration file, when read by an execution engine executed by a processing component, configures the execution engine to execute the portion of the software application represented by the model by invoking execution of the plurality of preexisting, verified, and compiled/linked software code segments specified in the configuration file.

These aspects and other embodiments may include one or more of the following features. The configuration file may identify the set of inputs to use with the plurality of software code segments. The configuration file may identify an order for invoking the software code segments. The execution engine may be configured by the configuration file to use the set of inputs specified in the configuration file to generate a set of outputs. The execution engine may be configured by the configuration file to use the set of inputs specified in the configuration file in the order specified in the configuration file to generate the set of outputs. The software development tool may further comprise a configuration file verification tool implemented by a processing component. The configuration file verification tool may be configured to verify whether the configuration file generated by the configuration file generator tool will cause the desired behavior for the software application. The configuration file verification tool may be further configured to: read the generated configuration file and the first design model on which the generated configuration file may be based; compare the expected behavior from execution of the plurality of preexisting, verified, and compiled/linked software code segments identified in the configuration file with the expected behavior from the first design model, and indicate whether the generated configuration file may be likely to cause the desired behavior for the software application. The software development tool may be further configured to generate a plurality of different user-selectable orders in which to execute the compiled/linked software segments representing the blocks in the first design model that obey data flow dependencies between the blocks, wherein the plurality of orders include a graphical order (e.g., top down and left to right) and one or more orders that are not directly based on a graphical ordering and that provide improved execution time behavior. The software development tool may be further configured to read a second design model comprising a plurality of individual blocks with a specified data flow between the blocks; and generate the configuration file, based on the first design model and the second design model.

In another embodiment, a computer-implemented method for generating a software application is provided. The method comprises reading a design model comprising a plurality of individual blocks with a specified data flow between the blocks, wherein each block has a defined behavioral expectation (e.g., debounce, integrate, 1st order Lag, multiplication, filter, limiter, logic function, math function, XOR), and wherein the design model is configured, by the plurality of individual blocks and the specified data flow between the blocks, to cause a desired behavior for the software application when given a set of inputs. The method further comprises generating a configuration file, based on the design model, that identifies a plurality of preexisting, verified, and compiled/linked software code segments configured to perform mathematical and/or logical actions to cause the desired behavior for the software application. The configuration file, when read by an execution engine executed by a processing component, configures the execution engine to execute the portion of the software application represented by the model by invoking execution of the plurality of preexisting, verified, and compiled/linked software code segments specified in the configuration file.

These aspects and other embodiments may include one or more of the following features. The configuration file may identify the set of inputs to use with the plurality of software code segments. The configuration file may identify an order for invoking the software code segments. The method may comprise using the set of inputs specified in the configuration file to generate a set of outputs. The method may comprise using the set of inputs specified in the configuration file in the order specified in the configuration file to generate the set of outputs. The method may comprise providing a configuration file verification tool implemented by a processing component to verify whether the generated configuration file will cause the desired behavior for the software application. The verifying whether the generated configuration file will cause the desired behavior for the software application may comprise: comparing the expected behavior from execution of the plurality of preexisting, verified, and compiled/linked software code segments identified in the configuration file with the expected behavior from the design model, and indicating whether the generated configuration file is likely to cause the desired behavior for the software application. The method may comprise providing an option to generate a plurality of different user-selectable orders in which to execute the compiled/linked software segments representing the blocks in the design model that obey data flow dependencies between the blocks, wherein the plurality of orders include a graphical order (e.g., top down and left to right) and one or more orders that are not directly based on a graphical ordering and that provide improved execution time behavior. The method may further comprise reading a second design model comprising a plurality of individual blocks with a specified data flow between the blocks; and generating the configuration file, based on the first design model and the second design model.

In another embodiment, provided is a non-transitory computer-readable medium having stored thereon instructions which when executed by a processor cause the processor to perform a method for generating a software application. The method comprises: reading a design model comprising a plurality of individual blocks with a specified data flow between the blocks, wherein each block has a defined behavioral expectation (e.g., debounce, integrate, 1st order Lag, multiplication, filter, limiter, logic function, math function, XOR), and wherein the design model is configured, by the plurality of individual blocks and the specified data flow between the blocks, to cause a desired behavior for the software application when given a set of inputs. The method further comprises generating a configuration file, based on the design model, that identifies a plurality of preexisting, verified, and compiled/linked software code segments configured to perform mathematical and/or logical actions to cause the desired behavior for the software application. The configuration file, when read by an execution engine executed by a processing component, configures the execution engine to execute the portion of the software application represented by the model by invoking execution of the plurality of preexisting, verified, and compiled/linked software code segments specified in the configuration file.

These aspects and other embodiments may include one or more of the following features. The configuration file may identify the set of inputs to use with the plurality of software code segments. The configuration file may identify an order for invoking the software code segments. The method may comprise using the set of inputs specified in the configuration file to generate a set of outputs. The method may comprise using the set of inputs specified in the configuration file in the order specified in the configuration file to generate the set of outputs. The method may comprise providing a configuration file verification tool implemented by a processing component to verify whether the generated configuration file will cause the desired behavior for the software application. The verifying whether the generated configuration file will cause the desired behavior for the software application may comprise: comparing the expected behavior from execution of the plurality of preexisting, verified, and compiled/linked software code segments identified in the configuration file with the expected behavior from the design model, and indicating whether the generated configuration file is likely to cause the desired behavior for the software application. The method may comprise providing an option to generate a plurality of different user-selectable orders in which to execute the compiled/linked software segments representing the blocks in the design model that obey data flow dependencies between the blocks, wherein the plurality of orders include a graphical order (e.g., top down and left to right) and one or more orders that are not directly based on a graphical ordering and that provide improved execution time behavior. The method may further comprise reading a second design model comprising a plurality of individual blocks with a specified data flow between the blocks; and generating the configuration file, based on the first design model and the second design model.

In another embodiment, a computer-implemented method for generating a software application is provided. The method comprises: reading a design model comprising a plurality of individual blocks, with data flow between the blocks, wherein each block has a defined behavioral expectation (e.g., debounce, integrate, 1st order Lag, multiplication, filter, limiter, logic function, math function, XOR), wherein the model is configured to behave in a manner that is desired for software to behave on a set of inputs to generate a desired set of outputs; and generating, using a configuration file generator tool, a configuration file that identifies a plurality of preexisting, verified, and compiled/linked software code segments configured to perform mathematical and/or logical actions, the set of inputs to use with the plurality of software code segments, and an order for invoking the software code segments. The configuration file, when read by an execution engine, is configured to cause the desired behavior modeled by the model by causing the execution engine to invoke the execution of the plurality of preexisting, verified, and compiled/linked software code segments using the inputs specified in the configuration file in the order specified in the configuration file to generate the desired set of outputs.

In another embodiment, a computer-implemented method is provided. The method comprises: reading a model comprising a plurality of individual blocks with data flow between the blocks, wherein each block has a defined behavioral expectation (e.g., debounce, integrate, 1st order Lag, multiplication, filter, limiter, logic function, math function, XOR), and wherein the model is configured to behave in a manner that is desired for software to behave on a set of inputs to generate a desired set of outputs. The method further comprises generating, using a configuration file generator tool, a configuration file that identifies a plurality of preexisting, verified, and compiled/linked software code segments configured to perform mathematical and/or logical actions, the set of inputs to use with the plurality of software code segments, and an order for invoking the software code segments. The configuration file, when read by an execution engine, is used to configure the variable memory to cause the desired behavior modeled by the model by causing the execution engine when invoked to execute the plurality of preexisting, verified, and compiled/linked software code segments using the inputs specified in the configuration file in the order specified in the configuration file to generate the desired set of outputs. The method further comprises reading the configuration file by a configuration file verification tool for verifying whether the configuration file generated by the configuration file generator tool causes the desired behavior modeled by the model, wherein the configuration file verification tool is configured to: access the configuration file and the model, compare the expected behavior from execution of the plurality of preexisting, verified, and compiled/linked software code segments identified in the configuration file with the behavior to be modeled by the model, and provide a status from the comparison indicating whether the configuration file generated by the configuration file generator tool caused the desired behavior modeled by the model. The method further comprises reading the configuration file by an execution engine containing the plurality of preexisting, verified, and compiled/linked software code segments, wherein the execution engine is configured to read the configuration file and invoke the execution of the plurality of preexisting, verified, and compiled/linked software code segments using the inputs specified in the configuration file in the order specified in the configuration file to generate the desired set of outputs.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A software development system for generating a software application, the software development system comprising a configuration file generator tool comprising a processing component, the configuration file generator tool configured to:
   read a first design model comprising a plurality of individual blocks with a specified data flow between the blocks, wherein each block has a defined behavioral expectation, wherein the first design model is configured, by the plurality of individual blocks and the specified data flow between the blocks, to cause a desired behavior for the software application when given a set of inputs; and
   generate a configuration file, based on the first design model, that identifies a plurality of preexisting, verified, and compiled/linked software code segments configured to perform mathematical and/or logical actions to cause the desired behavior for the software application; and
   wherein the configuration file, when read by an execution engine comprising a processing component, configures the execution engine to execute the portion of the software application represented by the model by invoking execution of the plurality of preexisting, verified, and compiled/linked software code segments specified in the configuration file.

2. The software development tool of claim 1, wherein the configuration file further identifies the set of inputs to use with the plurality of software code segments.

3. The software development tool of claim 2, wherein the configuration file further identifies an order for invoking the software code segments.

4. The software development tool of claim 3, wherein the execution engine is configured by the configuration file to use the set of inputs specified in the configuration file to generate a set of outputs.

5. The software development tool of claim 4, wherein the execution engine is configured by the configuration file to use the set of inputs, and which code segment is to receive which inputs as specified in the configuration file in the order specified in the configuration file to generate the set of outputs.

6. The software development tool of claim 1, further comprising a configuration file verification tool comprising a processing component, wherein the configuration file verification tool is configured to verify whether the configuration file generated by the configuration file generator tool will cause the desired behavior for the software application.

7. The software development tool of claim 6, wherein the configuration file verification tool is further configured to:
   read the generated configuration file and the first design model on which the generated configuration file is based;
   compare the expected behavior from execution of the plurality of preexisting, verified, and compiled/linked software code segments identified in the configuration file with the expected behavior from the first design model, and
   indicate whether the generated configuration file is likely to cause the desired behavior for the software application.

8. The software development tool of claim 1, further configured to generate a plurality of different user-selectable orders in which to execute the compiled/linked software segments representing the blocks in the first design model that obey data flow dependencies between the blocks, wherein the plurality of orders include a graphical order and one or more orders that are not directly based on a graphical ordering and that provide improved execution time behavior.

9. The software development tool of claim 1, further configured to:
read a second design model comprising a plurality of individual blocks with a specified data flow between the blocks; and
generate the configuration file, based on the first design model and the second design model.

10. A computer-implemented method for generating a software application, the method comprising:
reading a design model comprising a plurality of individual blocks with a specified data flow between the blocks, wherein each block has a defined behavioral expectation, wherein the design model is configured, by the plurality of individual blocks and the specified data flow between the blocks, to cause a desired behavior for the software application when given a set of inputs; and
generating a configuration file, based on the design model, that identifies a plurality of preexisting, verified, and compiled/linked software code segments configured to perform mathematical and/or logical actions to cause the desired behavior for the software application; and
wherein the configuration file, when read by an execution engine comprising a processing component, configures the execution engine to execute the portion of the software application represented by the model by invoking execution of the plurality of preexisting, verified, and compiled/linked software code segments specified in the configuration file.

11. The method of claim 10, wherein the configuration file further identifies the set of inputs to use with the plurality of software code segments.

12. The method of claim 11, wherein the configuration file further identifies an order for invoking the software code segments.

13. The method of claim 12, further comprising using the set of inputs specified in the configuration file to generate a set of outputs.

14. The method of claim 13, further comprising using the set of inputs specified in the configuration file in the order specified in the configuration file to generate the set of outputs.

15. The method of claim 10, further comprising providing a configuration file verification tool comprising a processing component to verify whether the generated configuration file will cause the desired behavior for the software application.

16. The method of claim 15, wherein verifying whether the generated configuration file will cause the desired behavior for the software application comprises:
comparing the expected behavior from execution of the plurality of preexisting, verified, and compiled/linked software code segments identified in the configuration file with the expected behavior from the design model, and
indicating whether the generated configuration file is likely to cause the desired behavior for the software application.

17. The method of claim 10, further comprising providing an option to generate a plurality of different user-selectable orders in which to execute the compiled/linked software segments representing the blocks in the design model that obey data flow dependencies between the blocks, wherein the plurality of orders include a graphical order and one or more orders that are not directly based on a graphical ordering and that provide improved execution time behavior.

18. A non-transitory computer-readable medium having stored thereon instructions which when executed by a processor cause the processor to perform a method for generating a software application, the method comprising:
reading a design model comprising a plurality of individual blocks with a specified data flow between the blocks, wherein each block has a defined behavioral expectation, wherein the design model is configured, by the plurality of individual blocks and the specified data flow between the blocks, to cause a desired behavior for the software application when given a set of inputs; and
generating a configuration file, based on the design model, that identifies a plurality of preexisting, verified, and compiled/linked software code segments configured to perform mathematical and/or logical actions to cause the desired behavior for the software application; and
wherein the configuration file, when read by an execution engine comprising a processing component, configures the execution engine to execute the portion of the software application represented by the model by invoking execution of the plurality of preexisting, verified, and compiled/linked software code segments specified in the configuration file.

19. The non-transitory computer readable medium of claim 18, wherein the configuration file further identifies a set of inputs to use with the plurality of software code segments and an order for invoking the software code segments, and the method further comprises using the set of inputs specified in the configuration file in the order specified in the configuration file to generate the set of outputs.

20. The non-transitory computer readable medium of claim 18, wherein the method further comprises verifying whether the generated configuration file will cause the desired behavior for the software application by:
comparing the expected behavior from execution of the plurality of preexisting, verified, and compiled/linked software code segments identified in the configuration file with the expected behavior from the design model, and
indicating whether the generated configuration file is likely to cause the desired behavior for the software application.

* * * * *